US011159369B2

(12) United States Patent
Gorka (10) Patent No.: US 11,159,369 B2
(45) Date of Patent: Oct. 26, 2021

(54) AUTOMATIC INITIALIZATION ROUTINE IN AN AUTOMATION SYSTEM

(71) Applicant: WAGO VERWALTUNGSGESELLSCHAFT MBH, Minden (DE)

(72) Inventor: Juergen Gorka, Minden (DE)

(73) Assignee: WAGO Verwaltungsgesellschaft mbH, Minden (DE)

(*) Notice: Subject to any disclaimer, the term of this patent is extended or adjusted under 35 U.S.C. 154(b) by 9 days.

(21) Appl. No.: 16/274,032

(22) Filed: Feb. 12, 2019

(65) Prior Publication Data

US 2019/0173748 A1 Jun. 6, 2019

Related U.S. Application Data

(63) Continuation of application No. PCT/IB2017/000858, filed on Jul. 20, 2017.

(30) Foreign Application Priority Data

Aug. 12, 2016 (DE) ............... 10 2016 009 857.0

(51) Int. Cl.
*H04L 12/24* (2006.01)
*G05B 19/042* (2006.01)
*G06F 13/374* (2006.01)

(52) U.S. Cl.
CPC ...... *H04L 41/0806* (2013.01); *G05B 19/0426* (2013.01); *G06F 13/374* (2013.01); *H04L 41/0853* (2013.01); *H04L 41/0869* (2013.01)

(58) Field of Classification Search
CPC ............ H04L 41/0806; H04L 41/0853; H04L 41/0869; G05B 19/0426; G06F 13/374
See application file for complete search history.

(56) References Cited

U.S. PATENT DOCUMENTS

2005/0256939 A1\* 11/2005 Naismith ........... G05B 19/0426
709/219
2007/0073850 A1\* 3/2007 Callaghan ............. G05B 19/05
709/220

(Continued)

FOREIGN PATENT DOCUMENTS

DE 102004049771 A1 4/2006
EP 3001310 A1 3/2016

OTHER PUBLICATIONS

International Search Report dated Sep. 22, 2017 in corresponding application PCT/IB2017/000858.

*Primary Examiner* — Thomas J Dailey
*Assistant Examiner* — Lam H Duong
(74) *Attorney, Agent, or Firm* — Muncy, Geissler, Olds & Lowe, P.C.

(57) ABSTRACT

A method for initializing a system that includes a base module and a first and a second expansion module, wherein the first and the second expansion modules are electrically, detachably connected to the base module and each have one or more electrical peripheral interfaces. The method includes the execution of an initialization routine by the system. The initialization routine includes the querying of the first and the second expansion modules with regard to description data that include characteristics of the electrical peripheral interfaces and an identifier of the first and the second expansion modules, the storage of a data structure that includes the queried description data, and the provision of the data structure to a configuration device.

18 Claims, 6 Drawing Sheets

(56) References Cited

U.S. PATENT DOCUMENTS

| | | | |
|---|---|---|---|
| 2007/0250180 A1 | 10/2007 | Bump et al. | |
| 2008/0189441 A1* | 8/2008 | Jundt | G05B 19/042 710/3 |
| 2012/0130512 A1* | 5/2012 | Song | G05B 19/054 700/86 |
| 2015/0127876 A1* | 5/2015 | Emi | G05B 15/02 710/315 |
| 2016/0048474 A1* | 2/2016 | Lv | G06F 13/10 710/38 |
| 2016/0259315 A1* | 9/2016 | Alexander | G05B 19/0426 |
| 2017/0227944 A1* | 8/2017 | Goli | G06F 3/0482 |
| 2018/0017952 A1* | 1/2018 | Jundt | H04L 12/00 |

* cited by examiner

AUTOMATIC INITIALIZATION ROUTINE IN AN AUTOMATION SYSTEM

This nonprovisional application is a continuation of International Application No. PCT/IB2017/000858, which was filed on Jul. 20, 2017, and which claims priority to German Patent Application No. 10 2016 009 857.0, which was filed in Germany on Aug. 12, 2016, and which are both herein incorporated by reference.

BACKGROUND OF THE INVENTION

Field of the Invention

The present invention relates to an automatic initialization routine in an automation system. In particular, the present invention relates to a computer-implemented initialization routine in a system that includes a base module and a first and a second expansion module that are electrically, and preferably also mechanically, detachably connected to the base module, wherein the base module has a field bus interface, and the expansion modules each have one or more electrical peripheral interfaces.

Description of the Background Art

In the process of configuring systems with a multiplicity of networked devices as, for example, automation systems, it can happen that configuration is made more difficult by the circumstance that the structure or the topology of the systems must be entered manually into a configuration program, with it being possible, on the one hand, that the person doing the entry may make mistakes, and also, on the other hand, the person doing the configuring must devote an amount of effort to entry that is not inconsiderable.

SUMMARY OF THE INVENTION

It is therefore an object of the present invention to overcome these and other problems by a method according to the invention for initializing an (automation) system and an (automation) system according to the invention equipped (or programmed) to automatically carry out the method.

The method according to an exemplary embodiment of the invention includes an execution by the system of an automatic initialization routine. The execution of the automatic initialization routine includes a querying of a first and a second expansion module (by a base module of the system) with regard to description data that include characteristics of electrical peripheral interfaces and an identifier of the first and the second expansion modules, a storage of a data structure (in the base module), wherein the data structure includes the queried description data, and a provision of the data structure to a configuration device (by the base module).

Expansion modules within the meaning of the invention can be understood here to mean, for example, devices that are intended and equipped to be electrically (and preferably also mechanically) detachably connected to the base module and/or to other expansion modules, thereby increasing the number of available electrical peripheral interfaces, and thus the capacity of the system with regard to receiving and/or sending electrical signals (or data encoded therein). In particular, an electrical interface that is equipped and intended to transmit electrical signals or electric power to other electrical devices or to receive electrical signals or electric power from other electrical devices, for example in order to thereby enable or support the implementation of an automation functionality, can be considered a peripheral interface in this context.

The base module can have a central processing unit, a memory, and a field bus interface, wherein the field bus interface can be equipped to send and to receive data through a data line connected to the field bus interface, and thereby to exchange data with network devices that are connected to the system through the field bus. Network devices are understood in this context to be any electrical devices that can exchange data with the base module through the field bus interface, but are not permanently connected (mechanically) to the housing of the system, and thus do not form a mechanical unit therewith. Network devices are thus electrical devices that are connected to the system with regard to the exchange of data, but at the same time are located at a spatial distance from the system.

The base module and the expansion modules can be connected through a bus system. The base module can be, for example, a bus coupler that is connected to the first expansion module (e.g., a first bus terminal) and to the second expansion module (e.g., a second bus terminal) through a serial communication bus. In this case, the bus coupler can then form a (logical) ring topology with the bus terminals, wherein the bus coupler feeds a data frame into the ring at a local bus output of the bus coupler and reads it out again at a local bus input of the bus coupler after passage through the ring. After receiving the data frame, the bus terminals can read data addressed to them out of the data frame, and for their part can write data addressed to the bus coupler into the data frame (for example, analogous to INTERBUS). For this purpose, the bus terminals can be equipped with a central processing unit and a (nonvolatile) memory. The (nonvolatile) memory can additionally include the description data about the bus terminal, for example in the form of information about the electrical peripheral interfaces of the bus terminal, such as, e.g., the number of analog peripheral interfaces, the number of digital peripheral interfaces, (permissible) current and voltage level ranges for the peripheral interfaces, etc.

Furthermore, the system can have a power supply connection that includes a two-pole or multipole electrical supply interface that is equipped and intended to be electrically connected to a power network (for example, a power network installed in a building and/or that supplies a machine with power). The power supply to the expansion modules and the data communication between the base module and the expansion modules can be realized, for example, through electrical pressure contacts, e.g., spring contacts or blade and bifurcated contacts, wherein the blade contacts of a second expansion module that is arranged in a row are in contact or engagement with corresponding spring or bifurcated contacts of a first expansion module.

In addition, the querying of one or more of the multiplicity of expansion modules with regard to description data about the electrical peripheral interfaces of the respective expansion modules can include the transmission of a query message from the base module to the expansion modules, wherein the first and the second expansion modules transmit identifiers and characteristics stored in the memory of the respective expansion module to the base module in response to the query message. The identifiers here can uniquely identify the relevant expansion module, for example by means of a type designation and/or a serial number, and the relevant characteristics can include information about the peripheral interfaces of the queried expansion module.

For example, the characteristics can include information about the fact that a first expansion module has a specific number of analog peripheral interfaces, and a second expansion module has a specific number of digital peripheral interfaces. In addition, the characteristics can include information about addressing of the peripheral interfaces. Moreover, the characteristics can include information about the fact that, e.g., a third expansion module has a peripheral interface through which data can be exchanged with electrical devices that are attached to a data cable connected to the peripheral interface.

The data structure can be a file that is stored in the memory of the base module. Furthermore, the provision of the data structure to the configuration device can take place through the field bus interface, for example by the means that the field bus interface is connected to the configuration device by means of a data cable or a radio link. Alternatively, the provision of the data structure can take place by means of a data carrier on which the data structure is (temporarily) buffered.

The method can also include an execution of a configuration routine by the configuration device. The configuration routine includes a definition of one or more receivers of status information, wherein the status information relates to analog or digital signals that are received through one or more of the peripheral interfaces or are applied to one or more of the peripheral interfaces. In addition, the configuration routine includes a definition of one or more senders of control information, wherein the control information relates to analog or digital signals that are to be sent through one or more of the peripheral interfaces or are to be applied to one or more of the peripheral interfaces.

Status information can be considered to be, for example, information that describes the analog or digital signals that are received through one or more of the peripheral interfaces or are applied to one or more of the peripheral interfaces at a given point in time or during a given period of time. Furthermore, control information can be considered to be, for example, information that describes the analog or digital signals that are to be sent through one or more of the peripheral interfaces or are to be applied to one or more of the peripheral interfaces at a given point in time or during a given period of time.

The one or more receivers of status information and the one or more senders of control information can be or can include the base module, one or more of the expansion modules, or one or more of the network devices with which data can be exchanged through the field bus interface. Moreover, the expansion modules can forward the status information to electrical devices that are attached to a data cable connected to the peripheral interface, and can receive the control information from electrical devices that are attached to the data cable connected to the peripheral interface.

The method additionally can include an execution of an operating routine by the system. The operating routine includes a sending of the status information to the one or more defined receivers, a receiving of the control information from the one or more defined senders, and a controlling of current and/or voltage levels that are applied to one or more of the peripheral interfaces on the basis of the control information.

The method can also include a querying of a network to which the system is connected, for example through the field bus interface, with regard to network devices with which the system can exchange data by means of a sending and receiving of data packets, and an identification of one of the network devices as the configuration device by means of the sending and/or receiving of data packets, wherein the provision of the data structure to the configuration device includes a transmission of the data structure to the configuration device by means of the sending of data packets to the configuration device.

For example, the system can be equipped to find the configuration device after storing the data structure, for instance in that the system is equipped to send a configuration data provision message to a multiplicity of network devices and to transmit the data structure to the configuration device in response to a configuration data request message from the configuration device.

The method can additionally include a check whether one of the queried expansion modules has a peripheral interface that is intended to send and to receive data packets through a data line connected to the peripheral interface and, if one of the queried expansion modules does have such a peripheral interface, the querying of the peripheral interface with regard to devices with which data can be exchanged by means of the sending and/or receiving of data packets through the peripheral interface. Information about the devices with which data can be exchanged by means of the sending and/or receiving of data packets through the peripheral interface can then be stored in the data structure and transmitted to the configuration device.

The device information can include unique identifiers and/or addresses of the devices and/or information about digital and/or analog peripheral interfaces of the devices.

For example, the device information can include type designations, serial numbers, MAC addresses (Media Access Control addresses), and/or IP addresses of the devices. Furthermore, the device information can include information about the fact that a first device has a first number of analog peripheral interfaces and a second expansion module has a number of digital peripheral interfaces. Furthermore, the device information can include information about an addressing of the peripheral interfaces through which data can be exchanged by means of the sending and/or receiving of data packets.

The base module and the first and the second expansion modules can be connected through a bus system, and the queried description data include addresses of the first and the second expansion modules.

For example, the description data can include physical positions of the expansion modules in the (logical) ring topology, by which means the expansion modules can be addressed during data exchange with the base module.

The system according to the invention includes a base module that has a central processing unit, a memory, and a field bus interface; and includes a first and a second expansion module that are mechanically and electrically detachably connected to the base module and that each have one or more electrical peripheral interfaces.

The system can be equipped to execute an initialization routine and, during the course of the initialization routine, to query the first and the second expansion modules with regard to description data, wherein the description data include characteristics of the electrical peripheral interfaces and an identifier of the first and the second expansion modules, to store a data structure that includes the queried description data, and to provide the data structure to a configuration device.

The system in operation can be additionally equipped to send and to receive data packets through a data line connected to the field bus interface, to send status information regarding analog or digital signals received at one or more of the peripheral interfaces to one or more receivers, and to control current and/or voltage levels that are applied to one or more of the peripheral interfaces on the basis of received control information.

The system can be additionally equipped to receive information from the configuration device about the one or more receivers of the status information.

The system can be additionally equipped to query a network with regard to network devices with which the system can exchange data by means of the sending and/or receiving of data packets, to identify one of the network devices as the configuration device, and to transmit the data structure to the configuration device by means of data packets sent to the configuration device.

The system can be additionally equipped to check whether one of the queried expansion modules has a peripheral interface that is equipped and intended to send and to receive data packets through a data line connected to the peripheral interface and, if one of the queried expansion modules has a peripheral interface that is equipped and intended to send and to receive data packets through a data line connected to the peripheral interface, to query the peripheral interface with regard to devices with which data can be exchanged by means of the sending and/or receiving of data packets through the peripheral interface, and to store in the data structure device information about the devices with which data can be exchanged by means of the sending and/or receiving of data packets through the peripheral interface.

The device information can include unique identifiers and/or addresses of the devices.

The base module and the first and the second expansion modules can be connected through a bus system, and the queried description data include addresses of the expansion modules or positions of the expansion modules in a (logical) ring topology, which is composed of the base module and the expansion modules. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
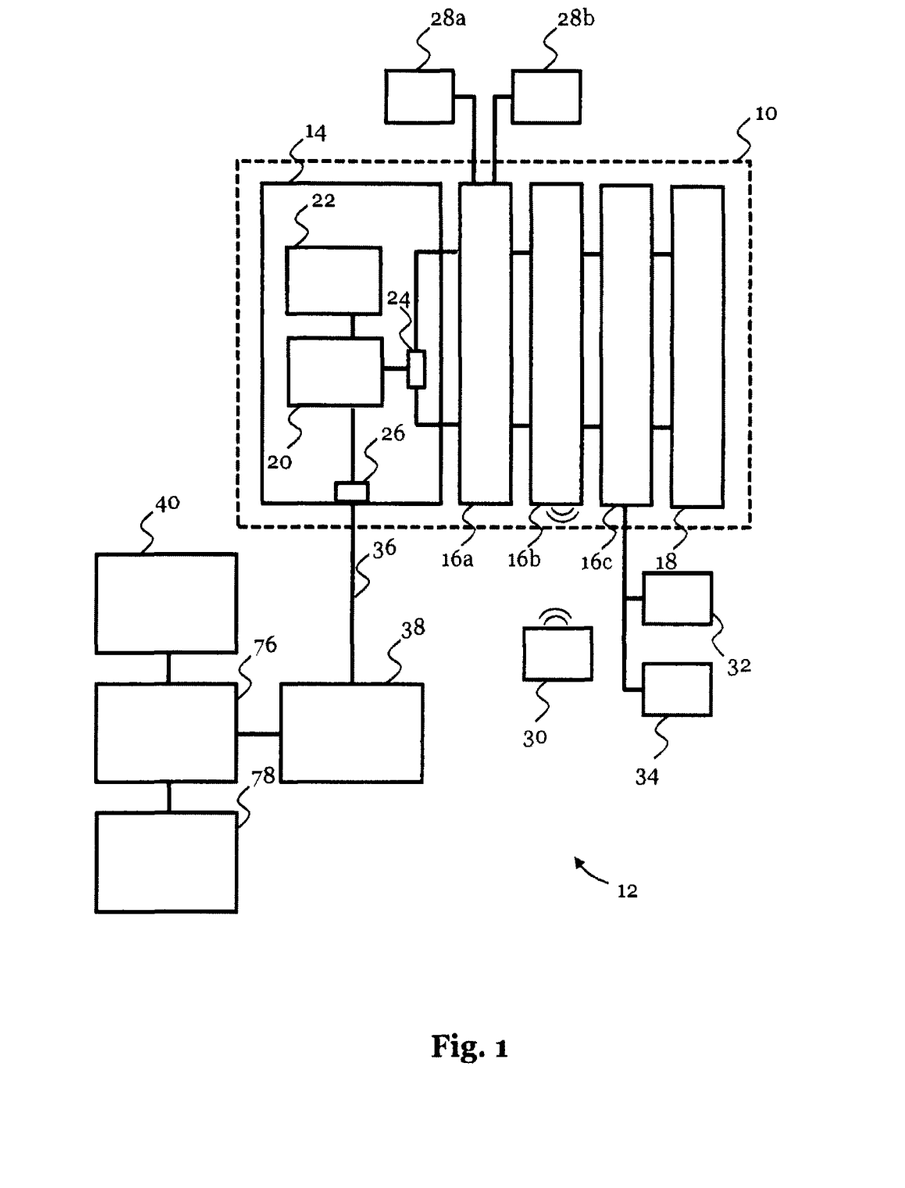
FIG. 1 shows a system according to an exemplary embodiment of the system according to the invention.

FIG. 1 shows a system 10 that is connected to a network 12. The system 10 includes a base module 14, three expansion modules 16*a*-16*c*, and a termination module 18. The system 10 can also have an adapter for attaching the system 10 to a mounting rail, for example a top-hat rail (e.g., TS 35). The base module 14, the expansion modules 16*a*-16*c*, and the termination module 18 are arranged in a row, and are electrically and mechanically detachably connected to one another. The base module 14 includes a central processing unit 20, a (nonvolatile) memory 22, a local bus communication unit 24, and a field bus interface 26. The memory 22, the local bus communication unit 24, and the field bus interface 26 are connected to the central processing unit 20 by data lines. The central processing unit 20 can have one or more processor cores, as well as one or more registers, and a memory manager that manages a working memory of the central processing unit 20.

The local bus communication unit 24 includes a local bus input and a local bus output, which are each connected by a data line to the expansion modules 16*a*-16*c* arranged in a row. The base module 14 and the expansion modules 16*a*-16*c* form a logical ring topology. The local bus communication unit 24 feeds data addressed to the expansion modules 16*a*-16*c* into the ring topology through the data line connected to the local bus input of the local bus communication unit 24, which data line is part of a first chain of data lines. To this end, the base module 14 generates, e.g., a data frame, which is to say a data structure of predefined size, which includes data addressed to one or more expansion modules 16*a*-16*c*, and transmits this data frame to the first expansion module 16*a*, which reads the data addressed to the first expansion module 16*a* out from the data frame, and writes into the data frame data addressed to other expansion modules 16*b*, 16*c* or to the base module 14.

The addresses of the expansion modules 16*a*-16*c* can be based on the applicable position in the row, for example in that addresses are assigned to the expansion modules 16*a*-16*c* or the expansion modules 16*a*-16*c* assign themselves addresses that are derived from their position in the row. For example, based on the applicable position in the row, the first expansion module 16*a* can be assigned the address "1," the second expansion module 16*b* can be assigned the address "2," and the third expansion module 16*c* can be assigned the address "3." In this process, each expansion module 16*a*-16*c* can receive the applicable address from the preceding expansion module 16*a*-16*c*, and derive its own address therefrom. In addition, the base module 14 can successively query the expansion modules 16*a*-16*c* thus addressed in order to determine how many expansion modules 16*a*-16*c* are arranged in a row with the base module 14, and thereby determine the address space to be used when communicating with the expansion modules (16*a*-16*c*). Alternatively, the base module 14 can prompt the expansion modules 16*a*-16*c*, for example through a query message transmitted to the expansion modules 16*a*-16*c* in a data frame, to write their addresses into the data frame. Furthermore, in the case of a fixed addressing pattern, each subsequent expansion module 16*a*-16*c* can overwrite an address written by the preceding expansion module 16*a*-16*c* into the data frame with its own address so that only a single address is transmitted to the base module 14, from which the base module 14 can deduce the addresses of the expansion modules 16*a*-16*c* on the basis of the addressing pattern. In addition, the base module 14 can determine the number of expansion modules 16*a*-16*c* from the circulation time of the data frame if the transmission of the data frame between the expansion modules 16a-16c follows a fixed cycle.

The local bus communication unit 24 reads the data addressed to the base module 14 by the expansion modules 16a-16c from the logical ring topology through the data line that is connected to the local bus output of the local bus communication unit 24, which data line is part of a second chain of data lines. For example, the base module 14 receives the data frame from the first expansion module 16a after passage through the ring topology, in which process the data frame is moved serially through the first chain of data lines from the first expansion module 16a through the adjacent second expansion module 16b to the third expansion module 16c, and in the reverse direction through the second chain of data lines from the third expansion module 16c through the adjacent second expansion module 16b to the first expansion module 16a.

As shown in FIG. 1, the first chain of data lines and the second chain of data lines are connected by the termination module 18, by which means the system 10 can be expanded as needed by the insertion of additional expansion modules, for example between the third expansion module 16c and the termination module 18. Furthermore, the system 10 can be modified by the removal or replacement of expansion modules 16a-16c. In this context, it must be noted that the number of expansion modules 16a-16c is not limited to three, but rather that, for example, 2, more than 5, more than 10, more than 25, more than 50, or more than 100 expansion modules can be arranged in a row with the base module 14 in other exemplary embodiments.

The expansion modules 16a-16c arranged in a row shown in FIG. 1 each have one or more peripheral interfaces. Thus, the first expansion module 16a has a first peripheral interface and a second peripheral interface. The first peripheral interface is connected through a first electric conductor to a first switch 28a. The second peripheral interface is connected through a second electric conductor to a second switch 28b. Furthermore, the second expansion module 16b has a radio interface that can be operated in alternation for sending and receiving data, and is connected by radio to an actuator unit 30. In addition, the third expansion module 16c has a third peripheral interface that is connected through a data cable to a first sensor 32 and to a second sensor 34. The sensors 32, 34 and the third expansion module 16c are participants in a bus system here. Furthermore, the third peripheral interface, like the radio interface, can be operated unidirectionally or bidirectionally.

The field bus interface 26 is connected through a data cable 36 to a control unit 38 that is intended to receive status information regarding analog or digital signals received at one or more of the peripheral interfaces and to control current and/or voltage levels that are applied to one or more of the peripheral interfaces on the basis of received control information. For example, the control unit 38 can be intended to accomplish a switching of the second switch 28b as a function of a measured value of the first sensor 32 when the first switch 28a is operated.

In order to simplify the implementation of this functionality, the system 10 is equipped to provide information about the available electrical peripheral interfaces of the expansion modules 16a-16c to a configuration device 40 that is intended for programming (of the system 10 and) of the control unit 38, by which means a system startup engineer programming the control unit 38 with the aid of the configuration device 40 is assisted in the addressing of the electrical peripheral interfaces of the system 10 or of the expansion modules 16a-16c. In particular, the system 10 is equipped to execute an initialization routine and, during the course of the initialization routine, to query the expansion modules 16a-16c with regard to description data about the electrical peripheral interfaces of the expansion modules 16a-16c.

For example, each of the expansion modules 16a-16c can be equipped to transmit an individual data structure containing information describing the relevant expansion module 16a-16c to the base module 14 in response to a query by the base module 14 regarding information that describes the relevant expansion module 16a-16c. The individual data structure can describe, for example, the number, addressing, and nature of the peripheral interfaces of the corresponding expansion module 16a-16c, and include a unique identifier of the same, with the aid of which it is possible, for example, to obtain further information about the expansion module 16a-16c (for example, from a server located in the network 12). The individual data structures can be combined into one data structure and stored in the memory 22 of the base module 14. The data structure can be prepared in a field-bus-specific manner, for example in that the field-bus-specific data structure has a format that is specified (by the field bus protocol) for data packets to be transmitted through the field bus. For example, the data structure can include multiple data packets, wherein each data packet begins with a field-bus-specific header, which is followed by data based on the information describing the relevant expansion module 16a-16c. For example, the data can include XML lists that include description data concerning the peripheral interfaces.

Figure 2:
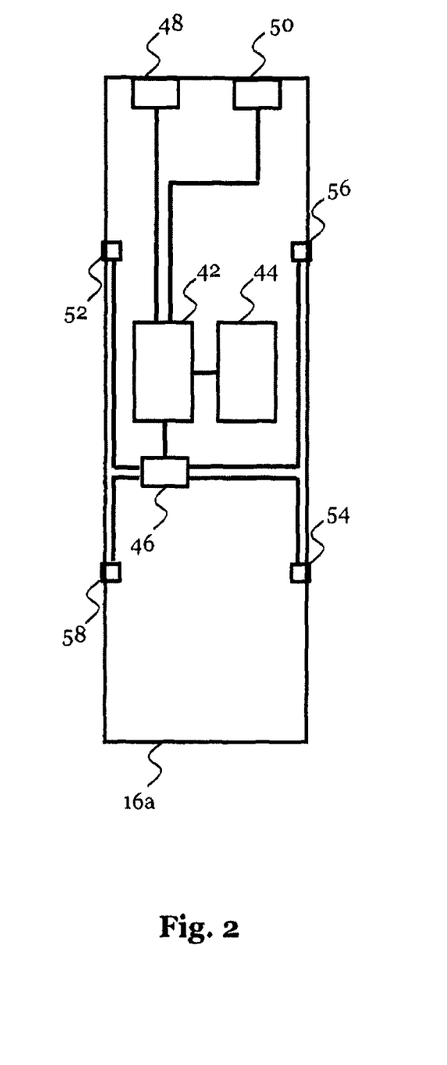
FIG. 2 shows a first expansion module of the system shown in FIG. 1.

In this regard, FIG. 2 shows one possible embodiment of the first expansion module 16a of the system 10 by way of example. The first expansion module 16a includes a central processing unit 42, a memory 44, a local bus communication unit 46, a first peripheral interface 48, and a second peripheral interface 50. The local bus communication unit 46 of the first expansion module 16a is connected to two local bus inputs 52, 54 and two local bus outputs 56, 58 of the first expansion module 16a. The first local bus input 52 and the second local bus output 58 are implemented, for example, as blade contacts that are pressed onto corresponding spring contacts of the local bus input or output of the base module 14 when the first expansion module 16a is arranged in a row with the base module 14, thus establishing a detachable electrical connection between the base module 14 and the first expansion module 16a.

In like manner, the first local bus output 56 and the second local bus input 54 of the first expansion module 16a can be implemented as spring contacts that are pressed onto corresponding blade contacts of the second expansion module 16b when the second expansion module 16b is arranged in a row with the first expansion module 16a, thus establishing a detachable electrical connection between the second expansion module 16b and the first expansion module 16a. Alternatively, the expansion modules 16a-16c can be connected by flexible cables, the ends of which are provided with, e.g., plugs that are plugged into corresponding sockets on the expansion modules 16a-16c. In addition, the ends of the cables can be connected by means of clip contacts provided in the expansion modules 16a-16c to respective expansion modules 16a-16c.

During the course of the initialization routine, if the local bus communication unit 46 receives, through the first local bus input 52, a query from the base module 14 with regard to information describing the first expansion module 16a, then in response to the query the processing unit 42 can read out a data structure stored in the memory 44 and containing information describing the first expansion module 16a (hereinafter also referred to as "first data structure"), and send it through the local bus communication unit 46 to the local bus communication unit 24 of the base module 14. In this context, the first data structure can contain information about the fact that the first expansion module 16a includes a first peripheral interface 48 and a second peripheral interface 50. Furthermore, the first data structure can contain information about whether the first peripheral interface 48 and the second peripheral interface 50 of the first expansion module 16a are analog or digital peripheral interfaces. In addition, the first data structure can contain information about how the first peripheral interface 48 and the second peripheral interface 50 of the first expansion module 16a are to be addressed. For example, the first data structure can include an address of the first peripheral interface 48 and an address of the second peripheral interface 50 of the first expansion module 16a.

Alternatively or in addition, the first data structure can include a unique identifier of the first expansion module 16a, by which means information is implicitly provided to the configuration device 40 about the electrical peripheral interfaces 48, 50 of the first expansion module 16a. In addition, the first data structure can contain information about whether the first peripheral interface 48 and the second peripheral interface 50 of the first expansion module 16a are connected to other devices. To this end, the first expansion module 16a can be equipped to check whether the first peripheral interface 48 or the second peripheral interface 50 is connected to a device, and store corresponding information in the first data structure. For example, the first data structure can contain information about the fact that the first peripheral interface 48 of the first expansion module 16a is connected to the first switch 28a, and the second peripheral interface 50 of the first expansion module 16a is connected to the second switch 28b.

Furthermore, the local bus communication unit 46 is equipped to forward, through the first local output 56 to the second and third expansion modules 16b, 16c, queries from the base module 14 received through the first local bus input 52 during the course of the initialization routine regarding information describing the second and the third expansion modules 16b, 16c. In addition, the local bus communication unit 46 is equipped to send information about the first expansion module 16a to the base module 14 through the second local bus output 58, and to forward information received through the second local bus input 54 from the second and third expansion modules 16b, 16c to the base module 14 through the second local bus output 58.

Figure 3:
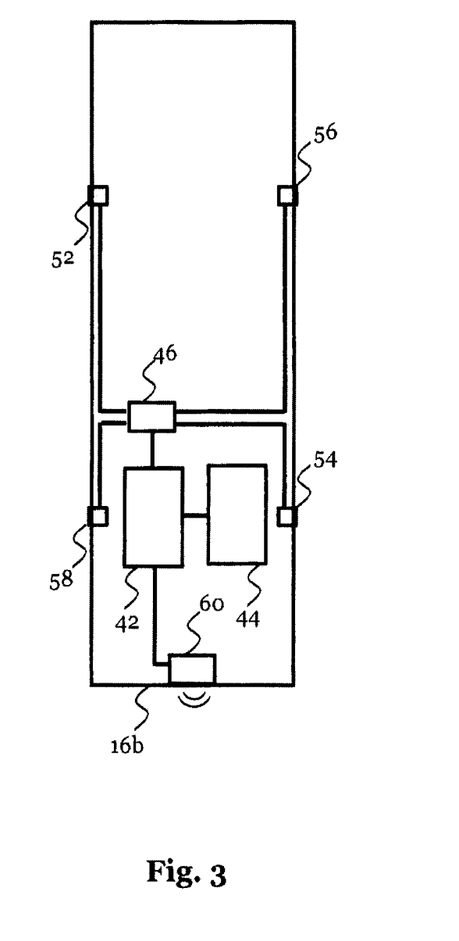
FIG. 3 shows a second expansion module of the system shown in FIG. 1.

FIG. 3 shows by way of example one possible embodiment of the second expansion module 16b of the system 10. The second expansion module 16b, like the first expansion module 16a, includes a central processing unit 42, a memory 44, and a local bus communication unit 46. However, instead of the first peripheral interface 48 and the second peripheral interface 50 of the first expansion module 16a, the second expansion module 16b includes the radio interface 60, which can be operated to send and receive data in alternation. As with the first expansion module 16a, the local bus communication unit 46 of the second expansion module 16b is connected to two local bus inputs 52, 54 and two local bus outputs 56, 58. The first local bus input 52 and the second local bus output 58 are implemented, for example, as blade contacts that are pressed onto corresponding spring contacts of the first expansion module 16a when the second expansion module 16b is arranged in a row with the first expansion module 16a, thus establishing a detachable electrical connection between the second expansion module 16b and the first expansion module 16a. Furthermore, the (alternative) contact types described in connection with the first expansion module 16a may also be realized.

During the course of the initialization routine, if the local bus communication unit 46 receives, through the first local bus input 52, a query from the base module 14 with regard to information describing the second expansion module 16b, then in response to the query the processing unit 42 can read out a data structure stored in the memory 44 and containing information describing the second expansion module 16b (hereinafter also referred to as "second data structure"), and send it through the local bus communication unit 46 to the local bus communication unit 24 of the base module 14. In this context, the second data structure can contain information corresponding to the information cited in connection with the first data structure. In addition, the second data structure can contain information about the radio standard or standards supported by the radio interface 60, as for example, EnOcean, ZigBee, Z-Wave, Bluetooth, WLAN, etc., as well as information about the devices that can be reached through radio. For example, the second data structure can include an address (e.g., MAC address) and a type of the actuator unit 30 (e.g., fan, heating valve, roller shutter motor, etc.).

Furthermore, the local bus communication unit 46 is equipped to forward, through the first local output 56 to the third expansion module 16c, a query from the base module 14 received through the first local bus input 52 during the course of the initialization routine regarding information describing the third expansion module 16c. In addition, the local bus communication unit 46 is equipped to send information about the second expansion module 16b to the base module 14 through the second local bus output 58 via the first expansion module 16a, and to forward information received through the second local bus input 54 from the third expansion module 16c to the base module 14 through the second local bus output 58 via the first expansion module 16a.

Figure 4:
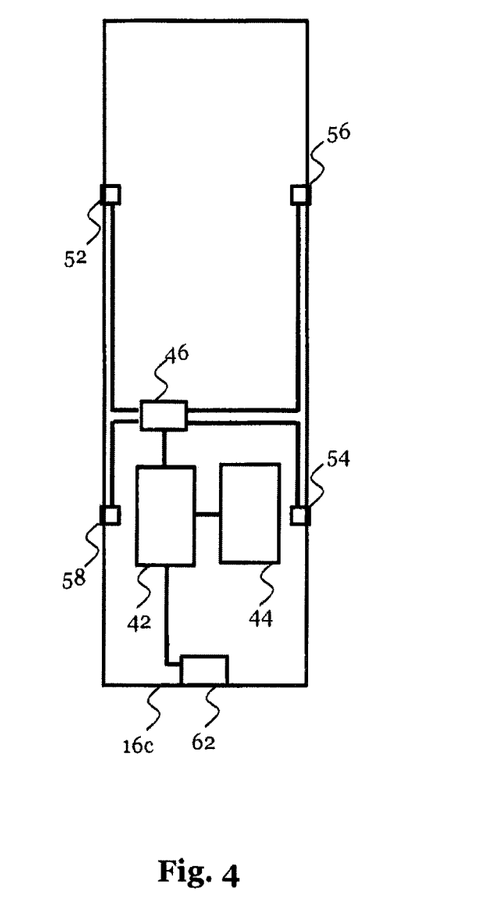
FIG. 4 shows a third expansion module of the system shown in FIG. 1.

FIG. 4 shows by way of example one possible embodiment of the third expansion module 16c of the system 10. The third expansion module 16c, like the first and the second expansion modules 16a, 16b, includes a central processing unit 42, a memory 44, and a local bus communication unit 46. However, instead of the first peripheral interface 48 and the second peripheral interface 50, or the radio interface 60, the third expansion module 16c includes the third peripheral interface 62. As with the first expansion module 16a and the second expansion module 16b, the local bus communication unit 46 of the third expansion module 16c is connected to two local bus inputs 52, 54 and two local bus outputs 56, 58. The first local bus input 52 and the second local bus output 58 are implemented, for example, as blade contacts that are pressed onto corresponding spring contacts of the second expansion module 16b when the third expansion module 16c is arranged in a row with the second expansion module 16b, thus establishing a detachable electrical connection between the third expansion module 16c and the second expansion module 16b. Furthermore, the alternative contact types described in connection with the first and second expansion modules 16a, 16b may also be realized.

During the course of the initialization routine, if the local bus communication unit 46 receives, through the first local bus input 52, a query from the base module 14 with regard to information describing the third expansion module 16c, then in response to the query the processing unit 42 can read out a data structure stored in the memory 44 and containing information describing the third expansion module 16c (hereinafter also referred to as "third data structure"), and send it through the local bus communication unit 46 to the local bus communication unit 24 of the base module 14. In this context, the third data structure can contain information corresponding to the information cited in connection with the first data structure. In addition, the third data structure can contain information about the communication standard or standards supported by the third peripheral interface 62, as for example, KNX, BACnet, MODBUS, LonWorks, Dali, MP-Bus, IO-Link, etc., as well as information about the devices that can be reached by means of the third peripheral interface 62 (at the time of the query). For example, the third data structure can include an address (e.g., a MAC address) and a type of one or both sensors 32, 34 (e.g., light sensor, temperature sensor, rain sensor, wind sensor, etc.).

Furthermore, the local bus communication unit 46 is equipped to receive a query from the base module 14 received through the first local bus input 52 during the course of the initialization routine regarding information describing the third expansion module 16c, and in response to send corresponding information to the base module 14 through the second local bus output 58 (through the second and the first expansion modules 16b, 16a).

Figure 5:
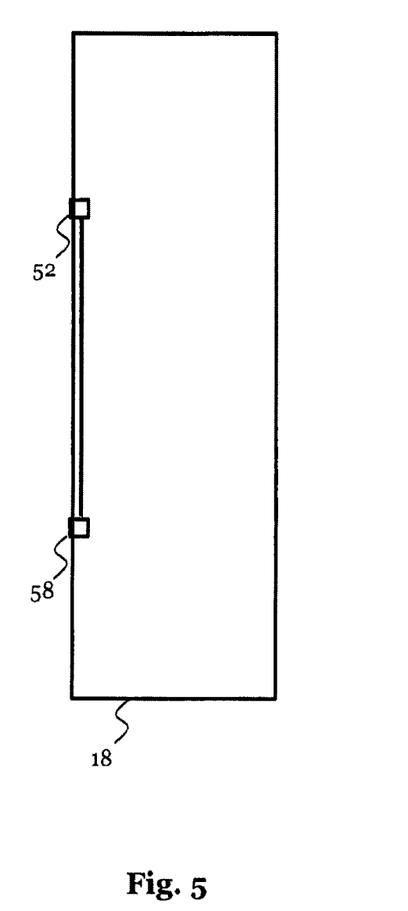
FIG. 5 shows a termination module of the system shown in FIG. 1.

FIG. 5 shows by way of example one possible embodiment of the termination module 18 of the system 10. The termination module 18 includes a local bus input 52 and a local bus output 58. The local bus input 52 and the local bus output 58 are electrically connected to one another, whereby the first chain of data lines is connected to the second chain of data lines, and the ring topology is closed. The local bus input 52 and the local bus output 58 are implemented, for example, as blade contacts that are pressed onto corresponding spring contacts of the third expansion module 16c when the termination module 18 is arranged in a row with the third expansion module 16c, thus establishing a detachable electrical connection between the termination module 18 and the third expansion module 16c. Furthermore, the alternative contact types described in connection with the first, second, and third expansion modules 16a, 16b, 16c may also be realized.

Figure 6:
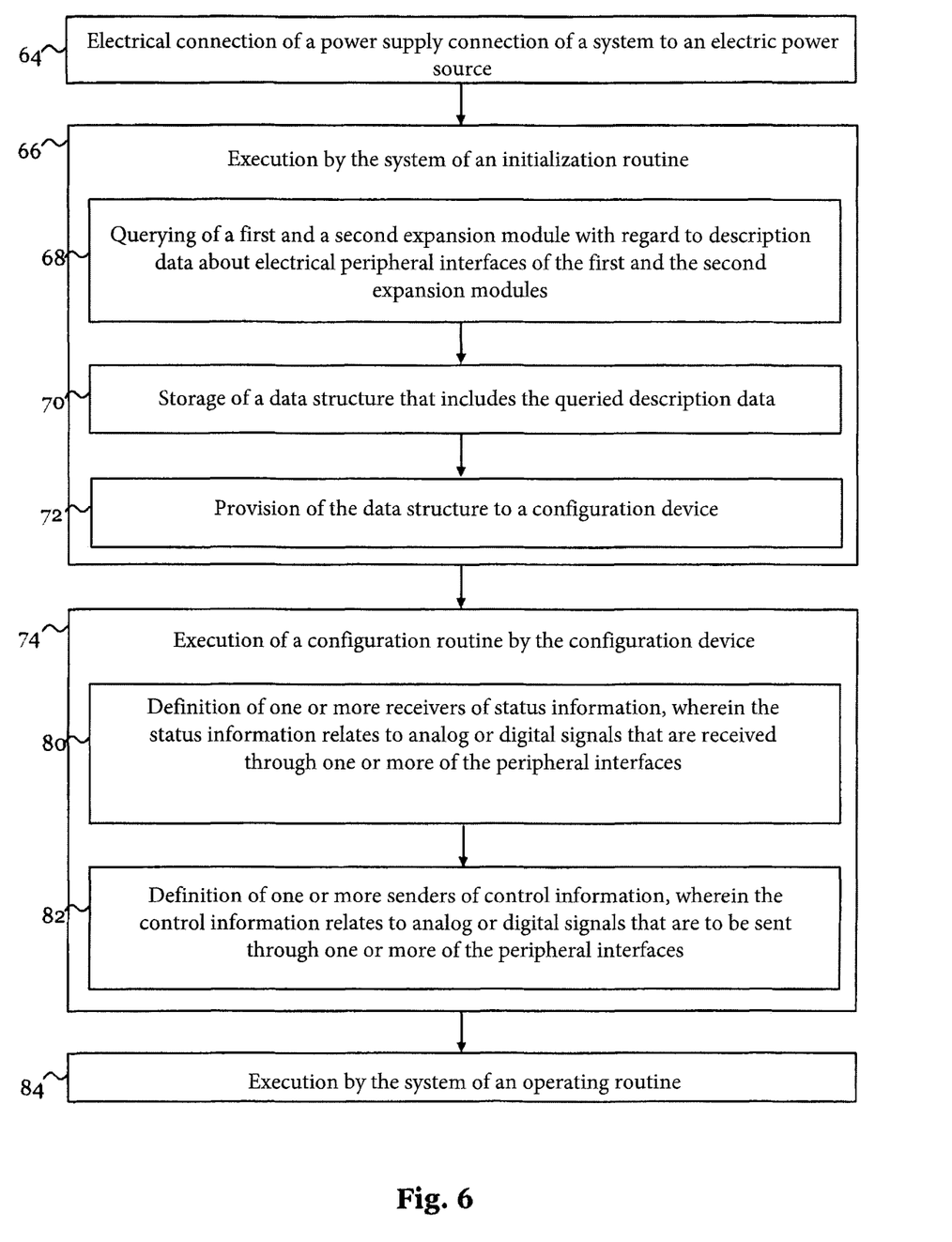
FIG. 6 shows a flowchart of a method for putting the system shown in FIG. 1 into operation according to an exemplary embodiment of the method according to the invention.

FIG. 6 shows a flowchart of the method for putting the system 10 into operation. The method starts at step 64 with providing the system 10 with electric power. Providing electric power to the system 10 can be a provision of electric power to the system 10 for the first time after the system 10 has been placed in an as-delivered condition (for example by a manufacturer of the system 10 or by a reset), or a provision of electric power to the system 10 and placement of the system 10 in an initialization state (by a system startup engineer), wherein the system 10 is equipped to execute an initialization routine in the initialization state. Placement of the system 10 in the initialization state can be accomplished by, for example, operating a switch on the system 10. Moreover, the placement of the system 10 in the initialization state can be accomplished in that the base module 14 detects a change in the number of expansion modules 16a-16c arranged in a row as compared to a (previous) recorded state. Moreover, the placement of the system 10 in the initialization state can be accomplished in that the base module 14 detects a change in the type or ordering of expansion modules 16a-16c arranged in a row as compared to a (previous) recorded state.

The execution (step 66) of the initialization routine includes the querying (step 68) of information regarding the expansion modules 16a-16c that are arranged in a row with the base module 14. For example, the said querying of information includes the querying of information regarding addresses, identifiers, a type, and available peripheral interfaces of the expansion modules 16a-16c. The queried information is stored in a data structure (step 70), and is provided to a configuration device 40 (step 72) or transmitted to the configuration device 40.

To this end, the system 10 can search the network 12 for the configuration device 40, for example. Thus, the system 10 can, for example, send a suitable query to the control unit 38 that is forwarded by the control unit 38 to additional network participants 76, 40, 78 (see FIG. 1). For example, the query can be forwarded by the control unit 38 to a router 76 that is equipped with a server 78 to provide software updates for the expansion modules 16a-16c and to provide information about the expansion modules 16a-16c. In response to the query, the router 76 can transmit a network address of the configuration device 40 to the control unit 38, which forwards the network address of the configuration device 40 to the base module 14. The system 10 can transmit the data structure through the network 12 to the configuration device 40, which can query supplementary information from the server 78. For example, the data structure can include a (unique) identifier for the third expansion module 16c that the configuration device 40 sends to the server 78, which in response transmits descriptive information regarding the third expansion module 16c to the configuration device 40. If the configuration device 40 determines that one or more files stored in the memory 44 of the third expansion module 16c can/must be updated, it can additionally retrieve a suitable update from the server 78 and transmit it to the third expansion module 16c.

The configuration device 40 can then be used by the person performing the configuration to configure the system 10, or can perform an automatic configuration. In this process, it is determined, in particular, (step 80) to whom the signals received at the peripheral interfaces 48, 60, 62 or status information (about the signals received at the peripheral interfaces 48, 60, 62) should be forwarded or sent. Moreover, it is possible to determine (step 82) which device should control the peripheral interfaces 50, 60. For example, it can be determined that the signals from the first sensor 32 should be sent to the actuator unit 30 and that status information about the signals from the second sensor 34 and about a switching state of the first switch 28a should be sent to the control unit 38. Furthermore, it can be determined that the switching state of the second switch 28b should be controlled by the control unit 38, for example as a function of the status information about the signals from the second sensor 34.

After configuration, the system 10 can be placed in an operating state in which it executes an operating routine (step 84). Placement in the operating state can be accomplished by a suitable signal of the configuration device 40 or by operating a switch on the system 10, for example. In the operating state, the system 10 then sends, e.g., the status information about the signals from the second sensor 34 and a switching state of the first switch 28a to the control unit 38, and receives status information from the control unit 38, and controls a switching state of the second switch 28b on the basis of the received status information. Through the provision of the data structure it is thus possible to simplify the configuration of the system 10, by which means it is possible to accelerate the placement of the system 10 in the operating state.

The invention being thus described, it will be obvious that the same may be varied in many ways. Such variations are not to be regarded as a departure from the spirit and scope of the invention, and all such modifications as would be obvious to one skilled in the art are to be included within the scope of the following claims:

What is claimed is:

1. A method for initializing a system that includes a base module and a first expansion module and a second expansion module, wherein the first and the second expansion modules are electrically, detachably connected to the base module and each of the first and second expansion modules have one or more electrical peripheral interfaces, the method comprising:
   executing an initialization routine by the system prior to configuration of electrical devices connected to the one or more electrical peripheral interfaces of the first expansion module or the second expansion module, the initialization routine comprising:
   querying of the first and the second expansion modules, by the base module, with regard to description data that include characteristics of the one or more electrical peripheral interfaces and an identifier of the one or more first and the second expansion modules,
   querying, by the system, a network having network devices connected to the base module, via a sending and receiving of data packets over a field bus connecting the network devices,
   identifying, by the system, one of the network devices as the configuration device via the sending and/or receiving of the data packets;
   storing, at the base module, a data structure that includes the queried description data;
   providing the data structure to a configuration device, wherein the providing of the data structure to the configuration device includes a transmission of the data structure to the configuration device via the sending of the data packets to the configuration device;
   querying a server for further information about the first and the second expansion modules by the configuration device;
   determining, by the configuration device, a configuration for the electrical devices connected to the first and second expansion modules via the one or more electrical peripheral interfaces; and
   transmitting the configuration from the configuration device to the first and second expansion modules,
   wherein the configuration includes control information that defines communication between the first and second expansion modules and the electrical devices, the configuration being determined based on the queried description data, the configuration defining one or more senders and one or more receivers for the electrical devices.

2. The method for initializing a system according to claim 1, further comprising:
   executing a configuration routine by the configuration device, based on the queried description data received at the configuration device, the configuration routine comprising:
   defining, automatically by the configuration device, the one or more receivers of status information, wherein the status information relates to analog or digital signals that are received through one or more of the peripheral interfaces; and
   defining, automatically by the configuration device, the one or more senders of control information, wherein the control information relates to analog or digital signals that are to be sent through one or more of the peripheral interfaces.

3. The method for initializing a system according to claim 2, further comprising:
   executing an operating routine by the system, the operating routine comprising:
   sending the status information to the one or more defined receivers; and
   receiving the control information from the one or more defined senders; and
   controlling a current and/or a voltage that is applied to one or more of the peripheral interfaces based on the control information, the configuration for the electrical devices determining where the control information from the one or more defined senders is sent.

4. The method for initializing a system according to claim 1, further comprising:
   checking whether one of the queried expansion modules has a peripheral interface that is intended and equipped to send and to receive data packets through a data line connected to the peripheral interface;
   querying the peripheral interface with regard to at least one of the electrical devices via the sending and/or receiving of the data packets through the peripheral interface, if one of the queried expansion modules does have a peripheral interface that is intended and equipped to send and to receive data packets through a data line connected to the peripheral interface; and
   storing, in the data structure, device information about the at least one of the electrical devices with which data about the peripheral interface is exchanged via the sending and/or receiving of the data packets.

5. The method for initializing a system according to claim 4, wherein the device information includes unique identifiers and/or addresses and/or information about digital and/or analog inputs and outputs of the devices.

6. The method for initializing a system according to claim 1, wherein the base module and the first and second expansion modules are connected through a bus system arranged in a ring topology, and wherein the queried description data include addresses of the first and second expansion modules.

7. A system comprising:
   a base module that comprises a central processing unit, a memory, and a field bus interface;
   a first expansion module and a second expansion module that are electrically, detachably connected to the base module in a ring topology, the first and second expansion module having one or more electrical peripheral interfaces connecting to one or more electrical devices;
   a configuration device disposed within an external network connected to the base module via the field bus interface, the configuration device determining a configuration based on description data for the one or more electrical devices and transmitting the configuration to the electrical devices, the configuration including control information defining where analog or digital signals are sent between the one or more electrical devices,
   wherein the system is adapted to execute an initialization routine, and, during the initialization routine:
   to query the first and the second expansion modules for the description data, wherein the description data include characteristics of the electrical peripheral interfaces and an identifier of the first and the second expansion modules;
   to query the external network having network devices, via the sending and/or receiving of data packets, to all the network devices;

to identify one of the network devices as the configuration device via the sending and/or receiving of the data packets;

to store a data structure on the base module that includes the queried description data; and to provide the data structure to the configuration device by transmitting the data structure to the configuration device via the data packets sent to the configuration device, the configuration device determining the configuration based on the description data for the one or more electrical devices; and to transmit the configuration from the configuration device to the first and second expansion modules, wherein the control information defines communication between the first and second expansion modules and the electrical devices, the configuration defining one or more senders and one or more receivers for the electrical devices.

8. The system according to claim 7, wherein the system in operation is additionally equipped:

to send status information regarding the analog or digital signals received at one or more of the peripheral interfaces to one or more receivers based on the configuration from the configuration device; and to control a current and/or a voltage that is applied to one or more of the peripheral interfaces based on the received control information.

9. The system according to claim 8, wherein the system receives information from the configuration device about the one or more receivers of the status information.

10. The system according to claim 7, wherein the system is adapted:

to check whether one of the queried first and second expansion modules has a first peripheral interface of the peripheral interfaces that is intended and equipped to send and to receive data packets through a data line connected to the first peripheral interface;

to query the first peripheral interface with regard to at least one of the electrical devices via the sending and/or receiving of the data packets through the first peripheral interface, if one of the queried first and second expansion modules has the first peripheral interface that is intended and equipped to send and to receive the data packets through the data line connected to the first peripheral interface; and to store, in the data structure, device information about the at least one of the electrical devices with which data is exchanged via the sending and/or receiving of the data packets through the first peripheral interface.

11. The system according to claim 10, wherein the device information includes unique identifiers and/or addresses of the devices.

12. The system according to claim 7, wherein the base module and the first and the second expansion modules are connected through a bus system, and wherein the queried description data include addresses of the expansion modules or positions of the first and second expansion modules in the ring topology of the base module and the first and second expansion modules.

13. The method for initializing a system according to claim 1, further comprising:

receiving at the configuration device the further information about the expansion modules from the server;

receiving an update for at least one of the first or the second expansion modules;

transmitting the update to the at least one of the first or the second expansion modules; and automatically configuring a ring topology of a bus network connecting the base module and the first and second expansion modules with the configuration, the configuration defining signaling of the peripheral devices connected to the first and second expansion modules.

14. The system according to claim 7, wherein the configuration device receives further information about the first and the second expansion modules and an update for at least one of the first or the second expansion modules from a server, wherein the configuration device transmits the update to the at least one of the first or the second expansion modules, and wherein a bus network forms the ring topology and the configuration device automatically configures a signaling between the peripheral devices connected to the first and second expansion modules in the bus network.

15. The method for initializing a system according to claim 1, wherein the description data that includes the characteristics of the one or more electrical peripheral interfaces and the identifier is combined by the configuration device together with the further information from the server into one data structure for configuration of the first and second expansion modules.

16. The system according to claim 7, wherein the configuration device receives further information about the first and the second expansion modules from a server, the configuration device combining the further information with the description data that includes the characteristics of the electrical peripheral interfaces and the identifier of the first and the second expansion modules into a data structure.

17. The method for initializing a system according to claim 1, further comprising:

after initializing the system via the initialization routine, executing a configuration routine on the configuration device, the configuration resulting from the configuration routine defining the one or more senders and the one or more receivers of the analog or digital signals through the one or more peripheral interfaces to the electrical devices, wherein prior to the execution of the initialization routine, the description data for the one or more peripheral interfaces is stored on the first and the second expansion modules which are connected between the base module and the electrical devices and connected between the configuration device and the electrical devices.

18. The system according to claim 7, further comprising:

after initializing the system via the initialization routine, the configuration device executes a configuration routine, the configuration resulting from the configuration routine defining the one or more senders and the one or more receivers of the analog or digital signals through the one or more peripheral interfaces to the electrical devices, wherein prior to the execution of the initialization routine, the description data for the one or more peripheral interfaces is stored on the first and the second expansion modules which are connected between the base module and the electrical devices and connected between the configuration device and the electrical devices.

* * * * *